United States Patent
Nozaki

[11] 3,858,442
[45] Jan. 7, 1975

[54] BREAK DOWN TESTER
[75] Inventor: Wataru Nozaki, Mobara, Japan
[73] Assignee: Hitachi, Ltd., Tokyo, Japan
[22] Filed: June 28, 1971
[21] Appl. No.: 157,318

[30] Foreign Application Priority Data
June 26, 1970 Japan............................. 45-55143

[52] U.S. Cl. .................................................. 73/94
[51] Int. Cl. ............................................ G01n 3/14
[58] Field of Search .............. 73/94, 95, 81, 78, 93, 73/88 R; 177/192

[56] References Cited
UNITED STATES PATENTS

| | | | |
|---|---|---|---|
| 213,525 | 3/1879 | Olsen .................................... | 73/95 |
| 642,978 | 2/1900 | Haase .................................... | 73/94 |
| 1,937,115 | 11/1933 | Hayford et al. ......................... | 73/81 |
| 2,187,345 | 1/1940 | Dinzl...................................... | 73/93 |
| 3,193,035 | 7/1965 | Ferro ............................. | 177/192 X |
| 3,533,284 | 10/1970 | Slemmons et al...................... | 73/95 |
| 3,537,301 | 11/1971 | Hasenwinkle........................... | 73/95 |
| 3,564,911 | 2/1971 | Slemmons et al...................... | 73/95 |
| 3,572,102 | 3/1971 | Baratta .................................. | 73/93 |
| 3,580,060 | 5/1971 | Huskey ................................... | 73/94 |

OTHER PUBLICATIONS
"A Preliminary Study of a Plunger Type of Jelly-Strength Tester," Sheppard, Sweet, Indust. & Engr. Chemistry, June, 1923.

*Primary Examiner*—James J. Gilu
*Attorney, Agent, or Firm*—Craig & Antonelli

[57] ABSTRACT

A breakdown tester of a relatively small brittle apertured article, typically a ferrite memory core, comprises a measuring unit including an arm formed of a calibrating arm and a supporting arm and mounted on a base in a balanced condition, a test table disposed between the supporting arm and the base for holding therebetween a test piece, and means for detecting the lowering of the supporting arm; a loading unit including at least one elongated flexible counter weight means with one end connected to the supporting arm, loading means for moving the other end of the weight means for increasing the effective weight of the flexible counter weight means, and means for converting the effective weight into an electric signal; and an operating unit including means for displaying the load applied to the supporting arm by the weight means and means responsive to the load for controlling the operation of the loading means whereby when the test piece is broken, the operation of the loading means is stopped by a signal from the lowering detecting means.

28 Claims, 4 Drawing Figures

Patented Jan. 7, 1975

INVENTOR

WATARU NOZAKI

BY Craig, Antonelli & Hill

ATTORNEYS

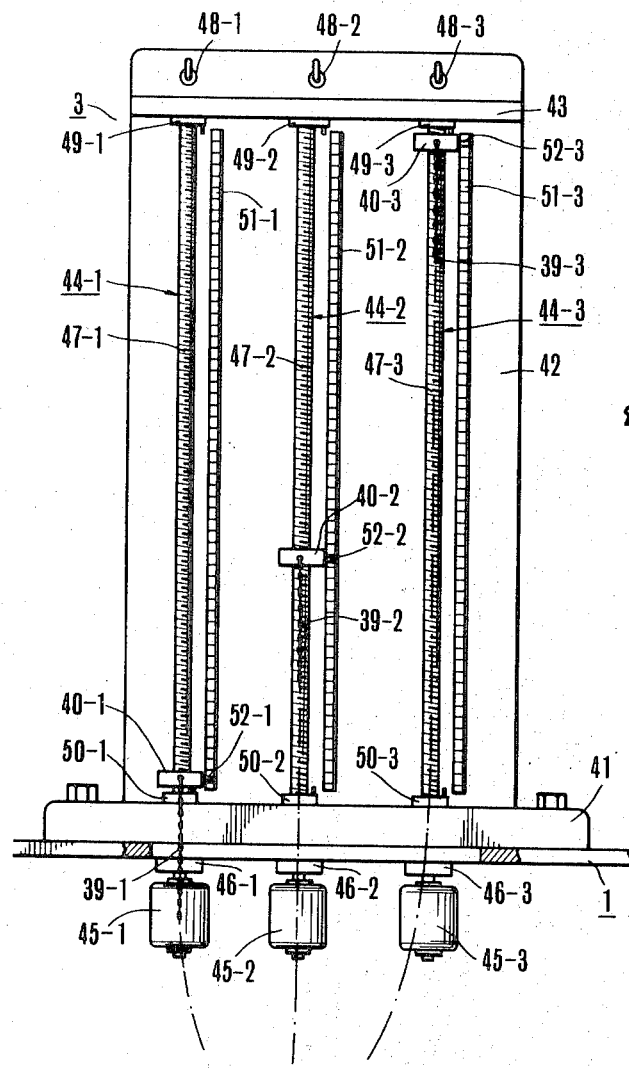
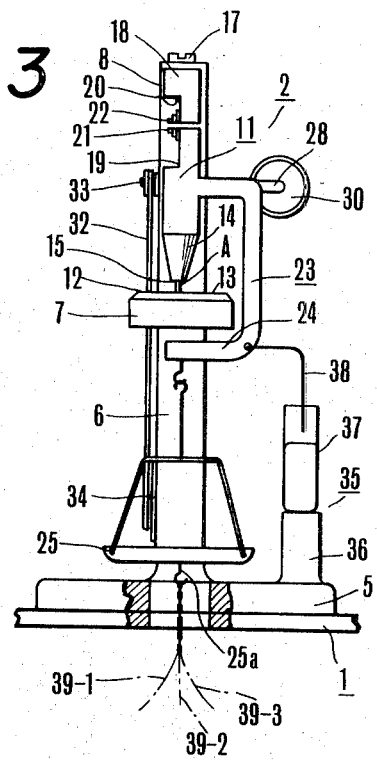

BREAK DOWN TESTER

BACKGROUND OF THE INVENTION

This invention relates to a breakdown tester for small, brittle, apertured articles and more particularly to a breakdown tester for small apertured articles having a diameter of about one millimeter or less, such as magnetic memory cores.

A prior art tester for measuring the breakdown strength of a test piece employs a loading mechanism in the form of a pendulum or a oil pressure device for loading the test piece and the load applied to the test piece is measured by a strain gauge meter or a oil pressure gauge. With such a breakdown tester it has been difficult to accurately measure the breakdown strength of a small, brittle, apertured articles whose diameters are about 1 mm or less and a breakdown strengths are from several tens to several hundreds grams. Moreover, the handling of such a small test piece is not easy.

To obtain more accurate results of the breakdown strength of such small test pieces, it has been proposed to use a light spring load or a weight balance. However, with the spring load it is difficult to detect the maximum load at the time of breakdown of the test piece, so that the value detected is erroneous and not reliable. In the case of the counter weight of a balance, it is impossible to continuously vary the counter weight and correctly determine the maximum load. Since the dynamic load on the small apertured article is greatly influenced by the way of setting the counter weight, the measuring operation requires a high degree of skill and the results of measurement are different from one operator to another.

SUMMARY OF THE INVENTION

It is an object of this invention to provide a novel tester for testing the breakdown strength of small, brittle, apertured articles having an outer diameter of approximately 1 mm or less and a breakdown strength of several tens to several hundred grams, at high measuring accuracies and without requiring a high degree of skill.

Another object of this invention is to facilitate the accurate measurement of the breakdown strength of very small, brittle, apertured articles under compressive force.

Still, another object of this invention is to provide an improved breakdown tester capable of accurately measuring the breakdown strength of very small, brittle, apertured articles under tension.

A further object of this invention is to provide an accurate breakdown tester which includes an arm composed of a calibrating arm and a supporting arm and flexible counter weight hung down from a counter weight setting dish of the supporting arm and the opposite end from a shoe which is lowered at a constant speed, so as to gradually increase the effective weight on the counter weight setting dish. By this means, the load applied on the test piece is equal to one half of the weight of the moved flexible counter weight, whereby the accuracy of measurement can be improved by at least a factor of 2.

Another object of this invention is to provide an improved breakdown tester wherein a test piece is supported between a test table and the end portion of a supporting arm which is slightly rotatable in a clockwise or counter-clockwise direction within a vertical plane; and a load applying point derived from a flexible counter-weight is aligned with the load receiving point of the test piece on a vertical straight line within the vertical plane, whereby one-half of the weight of the moved flexible counter-weight is constantly applied on the test piece independent of the arm length.

Another object of this invention is to provide an improved breakdown tester wherein the movement of said flexible counter weight means is converted into an electric digital signal representing the load applied to a test piece.

According to this invention there is provided a breakdown tester of a relatively small, brittle, apertured article comprising a staionary base; a measuring unit including an arm composed of a calibrating arm and a supporting arm and mounted on the base in the balanced condition, a test table disposed between the supporting arm and the stationary base for holding therebetween a test piece, and means for detecting the lowering of the one arm such as an open type mercury switch; a loading unit including at least one elongated flexible counter weight means having one end connected to the supporting arm, loading means for moving the other end of the counter weight means for increasing the effective weight of the flexible weight means applied on the test piece, and means for converting the increase in the effective weight into an electric signal; and an operating unit including means for displaying the load applied to the test piece by the weight means and means responsive to the load for controlling the operation of the loading means, whereby, when the test piece is broken, the operation of the loading means is stopped by a signal from the lowering detecting means.

BRIEF DESCRIPTION OF THE DRAWINGS

In the accompanying drawings:

FIG. 3 shows a side elevation of the measuring unit shown in FIG. 2 and

FIG. 4 shows a front elevation of the loading unit of the tester shown in FIG. 1.

DESCRIPTION OF THE PREFERRED EMBODIMENT

Figure 1:
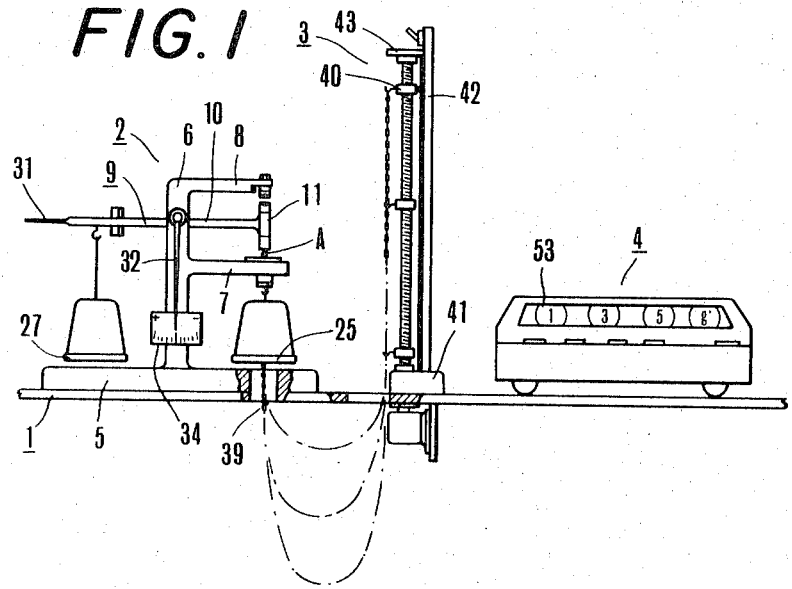
FIG. 1 shows a front elevation of a breakdown tester embodying the invention for measuring the breakdown strength of apertured articles.

With reference first to FIG. 1 of the accompanying drawings, the breakdown tester illustrated comprises a stationary platform 1, a measuring head 2, a loading unit 3, and an operating unit 4 which are mounted on platform 1.

Figure 2:
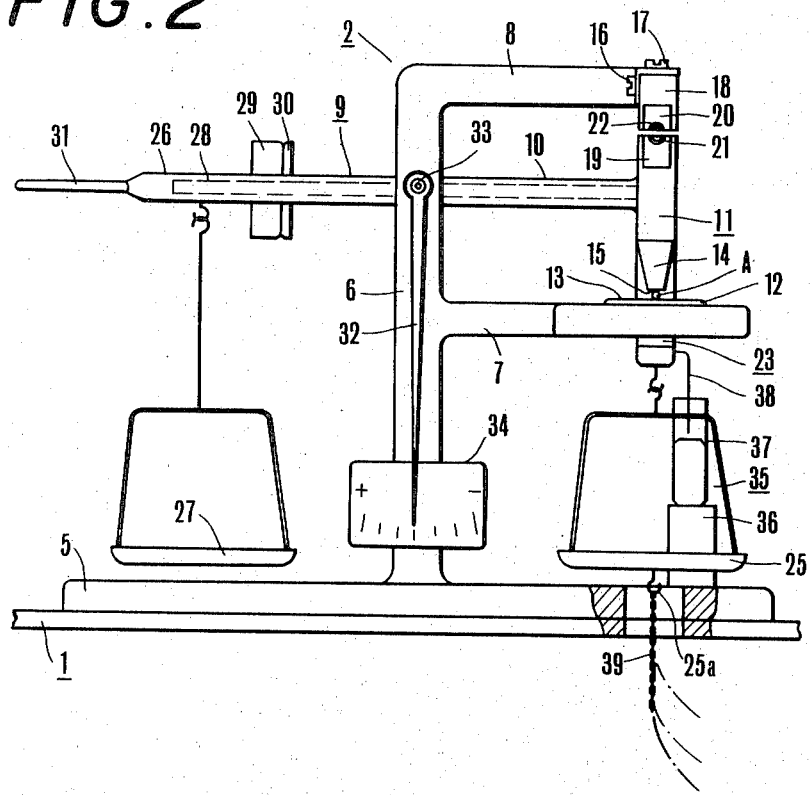
FIG. 2 shows a front elevation of the measuring unit of the tester shown in FIG. 1.

As shown in FIGS. 2 and 3, the measuring unit 2 comprises a base plate 5 mounted on platform 1 and a vertical post 6 mounted on the base plate. The vertical post has two parallel spaced apart horizontal arms 7 and 8 on one side thereof. At substantially the middle point between arms 7 and 8 is provided a center pin 33 to support a horizontal balance beam arm 9 which includes a supporting arm 10 and a calibrating arm 26. A vertical loading bar 11 is connected to the end of supporting arm 10 which extends in the same direction as arms 7 and 8. The loading bar 11 cooperates with arms 7 and 8 to constitute a test table for determining the breakdown strength of a test piece A.

More particularly, a horizontal supporting plate 12 is secured on the upper surface of the outer end of lower arm 7. A tapered anvil 14 is secured to the lower end of a loading bar 11 with the lower surface 15 of the anvil slightly spaced apart from the upper surface 13 of the supporting plate 12, so that the test piece A may be clamped between surfaces 13 and 15. A hook holder 18 is connected between the outer end of the upper arm 8 and the upper end of the loading bar 11 to be adjustable in the vertical and horizontal directions by means of a pair of set screws 16 and 17. The front surfaces of the upper portion of the loading bar 11 and of the hook holder 18 are finished to form flat mounting surfaces 19 and 20. On the adjacent edges of these surfaces are formed semicircular hooks 21 and 22 which cooperate with each other to form a cylindrical surface which fits in the opening of an apertured test piece. As indicated in FIG. 3, the diameter of the cylindrical surface varies step-wise in three steps to fit the inner diameter of a test piece. As indicated in FIG. 3, the diameter of the cylindrical surface varies step-wise in three steps to fit the inner diameter of a test piece.

As best shown in FIG. 3, loading bar 11 is formed with an integral letter C shaped bracket 23 whose lower leg 24 is used to hand a counter weight setting dish 25 just below the supporting arm 10. Further bracket 23 has a guide rod 28 extending in parallel with the arm 9. The guide rod 28 is provided with screw threads to receive an adjustable weight 29 and a stop ring 30 for fixing the position of the adjustable weight along guide rod 28. Another counter weight carrying dish 27 is hung from the calibrating arm 26 at a point symmetrical to the counter weight setting dish 25 with respect to the center pin. The outer end of arm 26 extends horizontally to carry an operating lever 31, so that a slight gap can be manually formed between the lower surface 15 of the anvil 14 and the upper surface 13 of the supporting plate 12 for receiving the test piece. The lower end of pointer 32 cooperates with a scale board 34 secured to the lower portion of the post 6.

As shown in FIG. 3, a pedestal 36 provided with means for adjusting its vertical position (not shown) is mounted on the base plate 5 to support a mercury bottle 37. The mercury pool contained in the mercury bottle 37 cooperates with a conductor 38 extending from bracket 23 to form a mercury switch 35 for detecting a slight displacement of the position of the loading bar 11 with a minimum operating force. When closed, the mercury switch stops the operation of driving motors 45–1, 45–2 and 45–3 and controls electromagnetic brakes 46–1, 46–2 and 46–3 of the loading unit 3, shown in FIG. 4. As shown in FIG. 3, the upper ends of a plurality of flexible counter weight means in the form of elongated chains 39–1, 39–2, and 39–3 are connected to a hook 25a at the bottom of the counter weight setting dish 25, the lower ends of these chains being supported by a plurality of shoes 40–1, 40–2 and 40–3, respectively, of the loading unit 3, as shown in FIG. 4.

FIG. 4 shows the detail of the loading unit 3. As shown, the loading unit comprises a base 41 mounted on platform 1 and a vertical supportign wall 42 secured to base 41. A plurality of feed screw units 44–1, 44–2 and 44–3 are mounted between an overhanging wall 43 horizontally projecting from vertical wall 42, and base 41. Feed screw unit 44–1 comprises a feed screw rod 47–1 driven by the driving motor 45–1, shoe 40–1 mating the screw threads of the feed screw rod 47–1 so as to be moved up and down, and an electromagnetic brake 46–1 utilized to instantly stop the rotation of the feed screw rod 47–1. A switch 48–1 corresponding to feed screw unit 44–1 is mounted on the upper end of the vertical wall 42 to selectively operate driving motor 45–1. The ON and OFF operations of switch 48–1 may be controlled by the operating unit 4. On the upper and lower ends of the feed screw rod 47–1 are provided an upper limit switch 49–1 and a lower limit switch 50–1, respectively which are disposed to be operated by shoe 40–1. At the top ends of the three sets of feed screw rods 47–1, 47–2, and 47–3 are provided, respectively, upper limit switches 49–1, 49–2 and 49–3 and at their bottom ends are provided lower limit switches 50–1, 50–2, and 50–3. The three upper limit switches of 49–1, 49–2, and 49–3 have the function of stopping the three shoes 40–1, 40–2 and 40–3 when they ascend in order that the weight put on hook 25a made null before the measurement is initiated. For measurement, first feed screw rod 47–1 is rotated, so that shoe 40–1 descends and when it reaches the bottom, lower limit switch 49–1 sends out a signal for feed screw rod 47–2 to begin rotating and at the same time stopping the rotation of feed screw rod 47–1. Likewise, lower limit switch 49–2 makes feed screw rod 47–3 start to rotate at the same time it stops the rotation of feed screw rod 47–2. Third lower limit switch 49–3 stops feed screw rod 47–3 when it comes to the bottom. All these limit switches are connected to operating unit 4 to control loading unit 3. Further, an array of sliding contacts 51–1 including a plurality of contacts is mounted on the supporting wall in parallel with and close to feed screw rod 47–1 to cooperate with a sliding brush 52–1 mounted on shoe 40–1 as it is moved in the vertical direction. The contact position between brush 52–1 and sliding contact array 51–1 determines the descent of chain 39–1, one end of which is fixed to shoe 40–1 and functions to indicate a stop in the movement of the chain and, hence, the rotation of the feed screw rod when the chain has descended a suitable distance. The sliding contact array 51–1 which the brush 52–1 touches comprises contacts 51–1 placed at equal intervals. The positions with equal intervals are so that brush 52–1 touches different contacts 51–1 for each gram of weight which is effected at the hook 25a of weight setting dish 25 as chain 39–1 descends. For this reason, the position where brush 52–1 touches contact array 51–1 can indicate the descent of chain 39–1. Sliding contact array 51–1 and brush 52–1 are electrically connected to the operating unit 4 to constitute a portion of a digital display circuit to display the load upon the loading bar 11 corresponding to the stopped position of chain 39. Feed screw units 44–2 and 44–3 are constructed similarly to feed screw unit 44–1, and so it is unnecessary to describe them.

The tester of this invention operates as follows. To measure the compression breakdown strength of the test piece A, the operating unit 4 is operated to rotate respective driving motors 45–1, 45–2 and 45–3 to move all shoes 40–1, 40–2 and 40–3 to their uppermost positions. Then, the supporting arm 10 and calibrating arm 26 are balanced with respect to the center pin 33 by using fixing ring 30 and adjustable weight 29 while watching the balanced condition indicated by pointer 32 and scale board 34. Under this condition, the anvil 14 cannot impart any pressure to the upper surface 13.

Thereafter, the operating lever 31 of the measuring unit 2 is manually depressed and test piece A is inserted in the gap formed between the lower surface 15 of anvil 14, now raised, and the upper surface 13 of supporting plate 12 with the axis of test piece A maintained horizontally. In this condition, the lower surface 15 of anvil 14 slightly touches on the annular end of the test piece, but without loading the test piece by the weight of the anvil 14. Then the level of pedestal 36 is adjusted such that the lower end of conductor 38 is positioned at a level just above the open surface of the mercury pool of mercury switch 35 to detect lowering of conductor 38 upon the breakdown of test piece A.

After completion of the preliminary operation described above, a start button (not shown) of the operating unit 4 is operated to close switch 48 corresponding thereto, for example, for starting driving motor 45-1 in the forward direction, thus descending shoe 40-1 at a constant speed. As a consequence, a load equal to one half of the weight of the chain, corresponding to the distance of movement of the movable end (connected to shoe 40-1) of chain 39-1, will be applied upon weight setting dish 25 and hence upon loading bar 11. This load applies a compressive force upon test piece A. The load applying point of the flexible chain is aligned on a vertical straight line with the load receiving point of the test piece. This maintains the calibrating arm and the supporting arm under a stationary state with the result that the anvil 14, secured to the lower end of the loading bar 11 of the supporting arm, comes in contact with the test piece. It should be noted that while a load applied to the test piece is increasing, the two arms are not acting in a balancing condition, but merely act to support the loading bar 11. The distance of movement of shoe 40-1 is converted into an electric digital signal corresponding to the contact position between contact 51-1 and brush 52-1 and the digital signal is displayed on one of display tubes 53 on the operating unit to display the load applied upon the test piece A. As a consequence, when the test piece is ruptured during the descending of shoe 40-1, loading bar 11 will descend rapidly to close mercury switch 35. The descent of the loading bar 11 is slight and corresponds to the thickness of the test piece. As such, the balance condition between the supporting arm 10 and the calibrating arm 26 is not effected. The closing of mercury switch 35 causes the operation of an electromagnetic switch (not shown) of the operating unit 4 to stop motor 45-1 concurrently with the energization of electromagnetic brake 46-1 whereby the rotation of feed screw rod 47-1 is stopped quickly. As a result, the movement of shoe 40 is also stoppped. In this manner, the load at which the test piece has broken down is continuously displayed on the display tube 53 of unit 4 thus indicating the breakdown strength of the test piece. The descending speed of chain 39-1, in other words, the loading speed, may be properly adjusted dependent upon the material, physical dimension and strength of the test piece. In the case of a magnetic memory element, such as a memory core, it is advantageous to select the descending speed to about several grams/sec.

During the loading step described above, when the test piece A is not broken even when shoe 40-1 descends to the lower end of feed screw rod 47-1, the shoe closes the lower limit switch 50-1 to operate another electromagnetic switch of the operating unit 4 to start operating motor 45-2 of the next stage. This will cause chain 39-2 to descend until the test piece A is broken. Where the test piece is not broken even when the second shoe 40-2 is lowered to the lower limit, then the third motor 45-3 is started to apply an additional load to chain 39-3.

Although in the foregoing description the driving motor 45-2 of the second stage was started through the electromagnetic switch (not shown) of the operating unit 4, after the lower limit switch 50-1 has been operated, where the approximate value of the breakdown strength of the test piece is already known, it is possible to increase the measuring efficiency by applying the majority of the breakdown load through chains 39-1 and 39-2 for example (in other words, chains 39-1 and 39-2 are lowered to their lowermost positions), so as to break the test piece with a small descent of chain 39-3. Where the test piece is so strong or hard that it will not be broken even when all chains 39-1, 39-2 and 39-3 of the loading unit 3 are lowered to their lowermost positions, it is advantageous to apply a preload to the test piece by a weight of known value. More particularly, after the calibrating arm and supporting arm have been balanced, a known weight is set on dish 25 to display the known weight by display tube 53. Thereafter, the load applied to the chain is added to the displayed value to determine the actual breakdown strength.

Where it is desired to determine the strain breakdown strength of the test piece with the same apparatus, hooks 21 and 22 are fitted into the central opening of the test piece. Particularly, the semi-circular-shaped hooks 21 and 22 secured to a hook holder 18 and the upper portion of a loading bar 11, respectively, are fitted into the aperture test piece. The diameter of the hooks 21 and 22 vary discretely by three steps to fit the inner diameter of the aperture test piece. When the test piece is large in size and a large amount of tensile force is required, the test piece is fitted onto a cylindrical hook close to the flat mounting surface having the larger diameter. When the size of the test piece is small and a small amount of tensile force is required, the test piece is fitted onto a cylindrical hook, apart from the flat mounting surface, having a smaller diameter. After the test piece is fitted onto the hook in this way, the tensile force applied to a small apertured test piece can readily be measured through the same procedure as the compressive force.

While the invention has been shown and described in terms of a preferred embodiment thereof it will be clear that many changes and modifications will occur to one skilled in the art without departing from the true spirit and scope of the invention as defined in the appended claims.

I claim:

1. A breakdown tester for relatively small, brittle, apertured articles comprising:
   a stationary base;
   a measuring unit including an integral supporting arm and calibrating arm supported by a center pin mounted on said base;
   a test table disposed between said supporting arm and said stationary base for holding therebetween a test piece;
   electrical means coupled to said supporting arm for detecting a slight lowering of said supporting arm when the test piece is broken;

a loading unit including at least one elongated flexible counter weight means having one end connected to said supporting arm, loading means for moving the other end of said counter weight means for increasing the effective weight of said flexible counter weight means applied on the test piece, and means for converting the effective weight into an electric signal; and an operating unit including means responsive to said electric signal for displaying the load applied to said test piece by said counter weight means and means responsive to said electrical means for controlling the operation of said loading means whereby, when said test piece is broken, the operation of said loading means is stopped by a signal from said electrical means detecting said slight lowering of said supporting arm.

2. A tester according to claim 1, wherein said test piece is a magnetic memory core having a diameter of 1 mm or less.

3. The tester according to claim 1, wherein said measuring unit comprises a guide rod provided with an adjustable threaded weight and a stop ring so as to support said integral supporting arm and calibrating arm without applying the load to the test piece mounted under the lower end of an anvil secured to said supporting arm.

4. The tester according to claim 1, wherein said measuring unit comprises a vertical post for supporting said calibrating arm and said supporting arm through a center pin, said post having an arm extending in parallel with said integral arms, said supporting arm being provided with an anvil projecting toward said test table so that said test piece is inserted between the lower end of said anvil and the upper surface of said test table.

5. The tester according to claim 1, wherein said elongated flexible counter weight means is in the form of a chain having one end connected to said supporting arm at a load applying point aligned in a vertical line with a load receiving point of said test piece whereby a load corresponding to one half the weight of the chain moved by said loading means is applied to said test piece.

6. The tester according to claim 1, wherein said slight lowering electrical detecting means comprises a mercury switch disposed to be closed when said supporting arm slightly descends upon breakdown of said test piece.

7. The tester according to claim 1, wherein said test piece takes the form of an apertured article.

8. A breakdown tester for relatively small, brittle, apertured articles comprising:
a stationary base;
a measuring unit including an integral supporting arm and calibrating arm supported by a center pin mounted on said base;
a test table disposed between said supporting arm and said stationary base for holding therebetween a test piece;
electrical means coupled to said supporting arm for detecting a slight lowering of said supporting arm when the test piece is broken;
a loading unit including at least one elongated flexible counter weight means having one end connected to said supporting arm, loading means for moving the other end of said counter weight means for increasing the effective weight of said flexible counter weight means applied on the test piece and means for converting the effective weight into an electric signal; and an operating unit including means for displaying the load applied to said test piece by said counter weight means and means responsive to said load for controlling the operation of said loading means whereby, when said test piece is broken, the operation of said loading means is stopped by a signal from said slight lowering detecting means wherein said loading unit comprises a plurality of feed screw rods, a plurality of driving motors for said feed screw rods, a plurality of shoes respectively, moved in the vertical direction by the rotation of said feed screw rods, each of said shoes being connected to said other end of said flexible counter weight means and being provided with an electric brush; a plurality of electric contact arrays along which said electric brushes slide, and electromagnetic brakes for quickly stopping the rotation of said feed screw rods.

9. The tester according to claim 8, wherein a limit switch is provided at the lower end of each of said feed screw rods, so that when said shoe is moved to the lower end of said feed screw rod, said limit switch is operated to start the rotation of the feed screw rod of the next stage.

10. A breakdown tester for a relatively small, brittle, apertured article comprising:
a stationary base;
a measuring unit including a vertical post mounted on said base;
an integral supporting arm and calibrating arm supported by said post in a stationary state, said post being provided with a first arm extending in the horizontal direction to act as a test table, an anvil secured to said supporting arm and projecting toward said test table;
a C-shaped bracket secured to said supporting arm, one leg of said C-shaped bracket extending beneath said test table;
a weight setting dish hung from said leg;
means for electrically detecting the slight lowering of said C-shaped bracket;
a loading unit, including at least one flexible counter weight means with one end connected to the bottom of said weight setting dish, loading means for moving the other end of said weight means for increasing the effective weight thereof, and means for converting said increase in the effective weight into an electric signal; and
an operating means including means responsive to said electric signal for displaying the load on said supporting arm applied by said weight means and means responsive to said detecting means for controlling the operation of said loading means.

11. The tester according to claim 10, wherein said post of said measuring unit includes a second arm extending in parallel with said first arm and wherein a hook support is connected to the free end of said second arm, said hook support confronting to one end of said supporting arm with a gap therebetween, a first hook is formed on one side of said hook support and a second hook is formed on the end of said supporting arm, said first and second hooks cooperating to hold a test piece.

12. The tester according to claim 11, wherein said hook support is provided with fine adjusting means for adjusting the hook support in the direction of said second arm and in the direction perpendicular thereto.

13. A test apparatus comprising:

first means for supporting a test piece;

second means coupled to said first means, for imparting both a compressive and a tensile force to said test piece in dependence upon the position of said test piece on said first means, at least one of said force being applied to said test piece;

third means, coupled to said second means, for varying the amount of force imparted to said test piece and for supplying an electrical signal indicative of the amount of variation of the force;

fourth means, coupled to said third means and to said first means, for stopping the variation of force by said third means upon the breakdown of said test piece in response to said force; and fifth means, coupled to said third means and to said fourth means, for indicating the magnitude of said varying force in response to said electrical signal and the force at which said test piece breakdown, wherein said third means comprises a loading unit having a plurality of feed screw rods, a plurality of driving motors for said feed screw rods, a plurality of shoes mounted on said rods and being displaceable in the vertical direction by the rotation of said feed screw rods, each of said shoes being connected to said bar means by flexible counter weight means and being provided with an electric brush, and wherein said fourth means comprises a plurality of electric contact arrays along which said electric brushes slide, and electromagnetic brakes for quickly stopping the rotation of said feed screw rods.

14. An apparatus according to claim 13, wherein said flexible counter weight means comprises a chain and wherein a limit switch is provided at the lower end of each of said feed screw rods, so that when said shoe is moved into the lower end of said feed screw rods, said limit switch is operated to start the rotation of the feed screw rod adjacent thereto.

15. An apparatus according to claim 14, wherein said fourth means further includes an electric switch having a pair of conductive contact portions, one of which is affixed to said bar means and the other of which is mounted on said base.

16. An apparatus according to claim 15, wherein said fifth means comprises an electrical display unit responsive to said electric signal for generating a visual indication of said varying force.

17. A test apparatus comprising:

first support means for supporting a test piece;

loading bar means for imparting one of a compressive force and a tensile force to said test piece in dependence upon the position of said test piece on said first support means;

second support means for initially supporting said loading bar means in a condition of no-load contact with respect to said test piece;

elongated flexible weight means for applying one of said forces imparted by said loading bar means at a first point connected to said loading bar means, said first point being in a vertical line with a second point at which said loading bar imparts forces to said test piece;

third means, coupled to said elongated flexible weight means, for varying the amount said forces imparted by said loading bar means and for supplying an electrical signal indicative of the amount of variation of said forces, said electrical signal being responsive to a position of the elongated flexible weight means;

fourth means, coupled with said loading bar means and said third means, for stopping the variation of forces by said third means upon the breakdown of said test piece in response to said forces; and fifth means, coupled to said third means and said fourth means, for indicating the magnitude of said varying forces in response to said electrical signal and the force at which said test piece breaksdown.

18. A test apparatus according to claim 17, wherein said first support means includes a base means, an upright means supported on said base means, first and second arm means spaced apart in parallel arrangement, a test table means secured to the first arm means for supporting said test piece in one position and a hook means secured to the second arm means for supporting said test piece in a second position, whereby said second support means supports said loading bar means between said first and second arms.

19. A test apparatus according to claim 18, wherein said loading bar means imparts a compressive force to said test piece in said one position and imparts a tensile force to said test piece in said second position.

20. A test apparatus according to claim 18, wherein said loading bar means includes a bar member having an anvil shape end adjacent said test table means and a hook means secured to an upper end of said bar member opposite said anvil shape end, said hook means secured to said upper end adjacent said hook means secured to said second arm.

21. A test apparatus according to claim 17, wherein said second support means includes an integral arm means, supported symmetrically by a center pin, having a suppporting arm for supporting said loading bar means and a calibrating arm including counterweight means for adjusting the loading bar means in said condition of no-load contact with respect to said test piece prior to imparting said forces to said test piece.

22. A test apparatus according to claim 17, wherein said third means comprises a loading unit having a plurality of feed screw rods, a plurality of driving motors for said feed screw rods, a plurality of shoes mounted on said rods and being displaceable in the vertical direction by the rotation of said feed screw rods, each of said shoes being connected to said bar means by flexible counter weight means and being provided with an electric brush, and wherein said fourth means comprises a plurality of electric contact arrays along which said electric brushes slide, and electromagnetic brakes for quickly stopping the rotation of said feed screw rods.

23. A test apparatus according to claim 22, wherein said elongated flexible weight means comprises at least one chain and wherein a limit switch is provided at the lower end of each of said feed screw rods, so that when said shoe is moved into the lower end of said feed screw rods, said limit switch is operated to start rotation of the feed screw rod adjacent thereto.

24. A test apparatus according to claim 17, wherein said fourth means further includes an electric switch having a pair of conductive contact portions, one of which is affixed to said loading bar means and the other of which is mounted on a base.

25. A test apparatus according to claim 24, wherein said electric switch means includes an open type mercury switch.

26. A test apparatus according to claim 17, wherein said fifth means comprises an electrical display unit responsive to said electric signal for generating a visual indication of said varying force.

27. A test apparatus according to claim 17, wherein said test piece is in the form of an apertured article.

28. A test apparatus according to claim 17, wherein said test piece is a magnetic memory core having a diameter of 1 mm or less.

* * * * *